(12) United States Patent
Utsui et al.

(10) Patent No.: US 6,442,475 B1
(45) Date of Patent: Aug. 27, 2002

(54) EXTENDABLE ON-VEHICLE INFORMATION SYSTEM

(75) Inventors: Yoshihiko Utsui; Kazuma Kaneko; Akio Uekawa; Minoru Yoshida; Tomoya Ikeuchi; Mitsuo Shimotani, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/969,090

(22) Filed: Oct. 3, 2001

(30) Foreign Application Priority Data

Apr. 19, 2001 (JP) ........................................ 2001-121011

(51) Int. Cl.$^7$ .............................................. G01C 21/00
(52) U.S. Cl. ........................ 701/200; 701/208; 340/990; 340/995; 707/104
(58) Field of Search ............................. 701/200, 208, 701/202; 340/990, 995; 707/100, 104; 709/219

(56) References Cited

U.S. PATENT DOCUMENTS 6,209,037 B1 * 3/2001 Brown et al. ................ 709/230
6,256,578 B1 * 7/2001 Ito ............................... 701/200

FOREIGN PATENT DOCUMENTS

JP  11-211489  8/1999

OTHER PUBLICATIONS

U.S. patent application Ser. No. 09/764,439, Kaneko et al., filed Jan. 19, 2001.

* cited by examiner

Primary Examiner—William A. Cuchlinski, Jr.
Assistant Examiner—Marthe Y. Marc-Coleman
(74) Attorney, Agent, or Firm—Leydig Voit & Mayer, Ltd

(57) ABSTRACT

An on-vehicle information system includes extended function interface modules responsible for communication between basic function modules, providing basic information services in an on-vehicle information system, and extended function modules.

5 Claims, 14 Drawing Sheets

EXTENDABLE ON-VEHICLE INFORMATION SYSTEM

BACKGROUND OF THE INVENTION

1. Field of the Invention

The present invention generally relates to on-vehicle information systems and, more particularly, to an on-vehicle information system that executes navigation service, hyper text browsing, and digital audio playback, etc., offers user related information, and allows effortless addition and deletion of these functions.

2. Description of the Related Art

FIG. 15 is a block diagram showing a system construction of related-art navigation apparatus shown in Japanese Laid-Open Patent Application No. 11-211489. Referring to FIG. 15, the navigation apparatus comprises navigation hardware 50, a device driver 52, a navigation OS 54, an addition and correction control unit 54a, a basic navigation operation unit 56, a Java virtual machine unit 58, a vehicle multimedia program unit 60, a Java basic application programming interface (API), a service module 64, a navigation class library 66, a Java diffusion API 68, and a navigation program API 70.

A description will now be given of the operation according to the related art.

The navigation hardware 50 includes a microprocessor for executing a program, a recording medium such as a CD-ROM storing maps and programs, and a reading device for reading from the recording medium. The navigation hardware 50 is controlled by the device driver 52. The basic navigation unit 56 is located in a layer above the navigation OS 54. The basic navigation operation unit 56 performs basic operations of navigation such as current position computation and route computation. The vehicle multimedia program unit 60 written in Java is interpreted and executed by the Java virtual machine unit 58. The Java basic API is located between the Java virtual machine unit 58 and the vehicle multimedia program unit 60. A vehicle multimedia program not included in the basic navigation operation is designated as an extended program and is built into the basic system from a CD-ROM (not shown). When an extended API code for navigation related to the basic navigation operation is generated while the vehicle multimedia program is being executed, the code is processed as follows.

A determination is made as to whether the control code generated in the vehicle multimedia program is an extended API code for navigation. If it is determined that the control code is an extended API code for navigation, a service unit comprising the service module 64 modifies the extended API code for delivery to the basic navigation operation unit 56, wherein the basic operation in accordance with the modified code is executed.

In the above-described construction of the related-art navigation apparatus, it is necessary to provide the service module 64 with extended API codes for navigation that are expected to be used, regardless of whether or not individual vehicle multimedia programs will use them. It is also necessary to provide service units and navigation program APIs corresponding to the extended codes. As a result, the size of the service module 64 is increased. Another disadvantage is that the reliability and responsiveness of the system suffers and the initial design of the system requires a relatively high cost.

Further, in order to add new extended API codes associated with the addition of new functions to the basic navigation operation unit 56 or to the vehicle multimedia program unit 60, it is necessary to update the entirety of the service module 64. Updating of the service module 64 is not an easy task to perform.

SUMMARY OF THE INVENTION

Accordingly, a general object of the present invention is to provide an on-vehicle information system in which the aforementioned problems are eliminated.

Another and more specific object is to provide an on-vehicle information system in which the scale of modules additionally installed is reduced, the reliability of the system is improved and the initial designing is facilitated, by optimally defining extended functions subject to cooperation, and by providing function modules with interface modules necessary to realize cooperation between the basic function and the extended function.

Still another object is to provide an on-vehicle information system in which addition of functions and step-by-step development of the function is facilitated.

The aforementioned objects can be achieved by an on-vehicle information system comprising: a platform unit including hardware, basic software controlling and managing the hardware, and executing a program; a basic function module started at the same time as the platform is started and provided with programs that offer basic on-vehicle information services; an extended function module built into the platform as required, and provided with programs that offer extended on-vehicle information services, wherein the basic function module is provided with an extended function interface module for exchanging information and commands with the extended function module, the extended function module is provided with a basic function interface module for exchanging information and commands with the basic function module, the extended function module and the basic function module exchange information for cooperation via one or both of the basic function interface module and the extended function interface module.

The extended function module may comprise: a virtual platform built on the platform unit; and an extended function application interpreted and executed in the virtual platform, and written in a language not dependent on the platform unit, and the basic function interface module may be provided in the extended function application.

The virtual platform may be a Java virtual machine, the extended function application may be written in Java, and the basic function interface module and the extended function interface module may communicate with each other in accordance with Java native interface.

The basic function module may comprise a plurality of basic function sub-modules and the extended function interface module, and the basic function sub-module or the extended function interface module may be provided with a communication specification definition unit defining a specification for communication with other modules with which communication is required.

The basic function interface module included in the extended function application module may be provided with basic function interface modules adapted for basic function sub-modules with which communication is required in executing an extended function, so that a function of the basic function sub-module is used via the basic function interface module.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

First Embodiment

Figure 1:
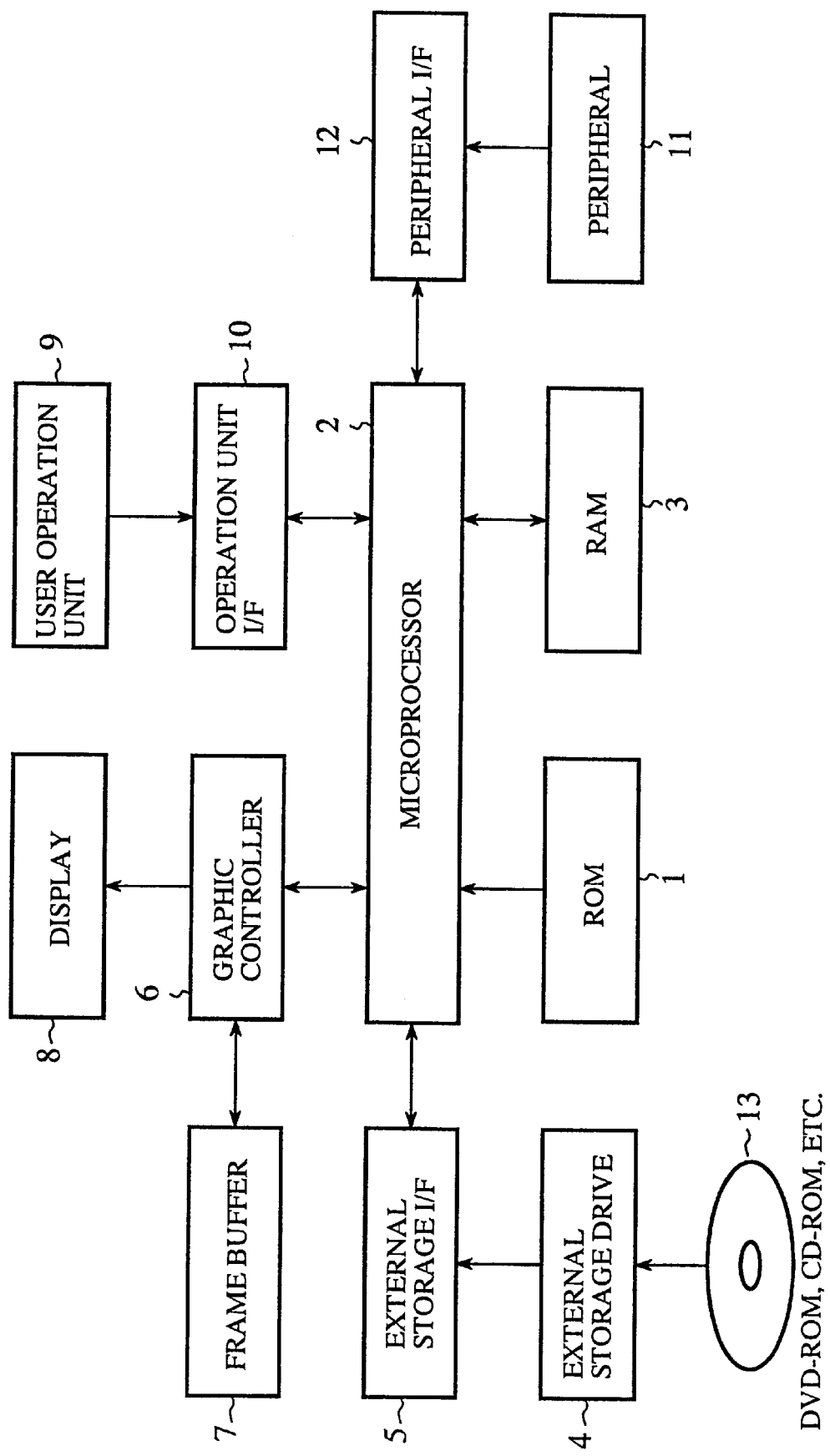
FIG. 1 is a block diagram showing a hardware construction of an on-vehicle information system according to a first embodiment of the present invention.

FIG. 1 is a block diagram showing a hardware construction of an on-vehicle multimedia apparatus (on-vehicle information system) according to the first embodiment of the present invention. Referring to FIG. 1, the on-vehicle multimedia apparatus comprises a ROM 1 that stores programs including a basic function module and an extended function module, a microprocessor 2 for executing programs including the basic function module and the extended function module, and a RAM 3 for temporarily storing programs and data while a program such as the basic function module and the extended function module is being executed. An external storage drive 4 accesses an external storage medium such as a DVD/ROM or a CD/ROM so as to read data, an external storage interface (I/F) is responsible for exchange of data between the external storage drive 4 and the microprocessor 2. A graphic controller 6 stores image data in a frame buffer 7 in accordance with image processing instructions from the microprocessor 2 so as to draw an image corresponding to the image data on a display 8 such as a liquid crystal display. A user operation unit 9 is implemented by a remote controller or a switch. An operation unit interface 10 is responsible for exchange of data between the user operation unit 9 and the microprocessor 2. A peripheral 11 may include a car navigation device operated on vehicle speed pulses and gyros, a set of amplifier and a speaker for voiced guidance and music playback. More specifically, there may be provided a GPS receiver for detecting vehicle position information, gyros for detecting the orientation of the vehicle, a vehicle pulse sensor for detecting information on the vehicle speed , a speaker and a driver circuit for outputting voiced guidance, an FM multiplex broadcast receiver for communicating with an external infrastructure, a radio beacon/optical beacon receiver, and a portable telephone set. A peripheral interface (I/F) is responsible for exchange of data between the peripheral 11 and the microprocessor 2. An external storage medium 13 stores a fixed data base such as maps, points of interest (POI), etc.. The external storage medium may be a DVD-ROM, a CD-ROM or a memory card. It is also possible to use a hard disk as an external storage.

The programs including the basic function module and the extended function module may be stored in a recording medium such as a DVD-ROM instead of in the ROM 1 so that the program is read from the external storage medium. Alternatively, the ROM may only store the basic function module and extended function applications may be stored in the external storage medium 13 so that the application is read as required.

Figure 2:
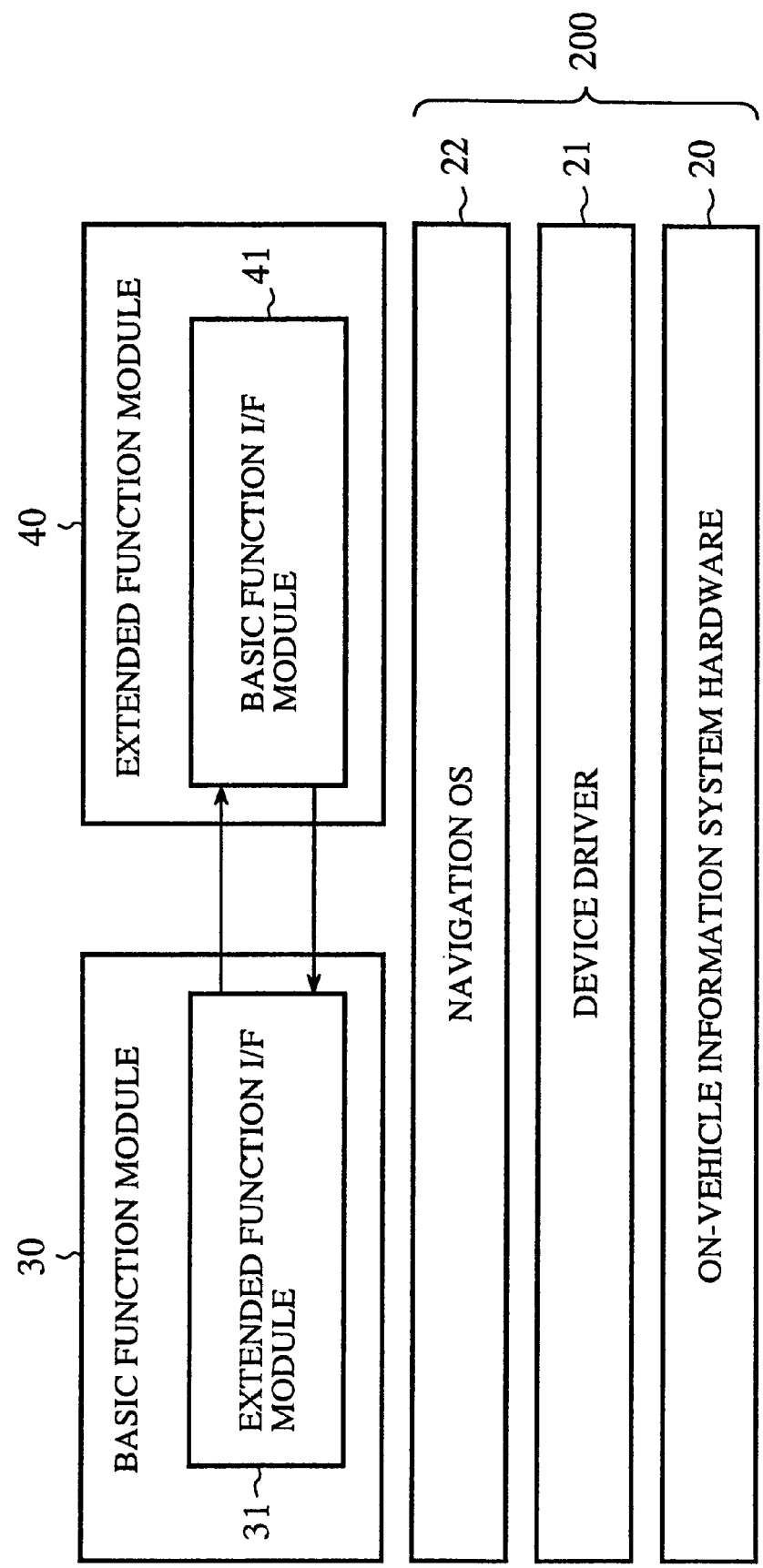
FIG. 2 shows a multi-layered construction of the on-vehicle information system according to the first embodiment.

FIG. 2 shows a multi-layered construction of the on-vehicle information system according to the first embodiment. Referring to FIG. 2, the on-vehicle information system includes on-vehicle information system hardware 20, a device driver 21 for controlling the on-vehicle information system hardware 20, a navigation OS 22 for managing and controlling the on-vehicle information system hardware 20 using the device driver 21, providing an operating environment for modules (described later), and executing programs. The on-vehicle information system hardware 20, the device driver 21, and the navigation OS 22 constitute a platform unit 200.

A basic function module 30 is programmed using native codes that depend on the navigation OS 22. The basic function module 30 computes a current vehicle position and a target route, based on information retrieved from the on-vehicle information system hardware 20 via the device driver 22. Moreover, the basic function module 30 provides, via the device driver 21, a signal to a display unit (not shown) or a speaker (not shown) provided in the on-vehicle information system hardware 20, so as to provide a display and playback of voiced guidance. The on-vehicle information system is shipped with the basic function module 30 being written in native codes adapted for the microprocessor 2 and the navigation OS 22 and is stored in the ROM 1, so as to ensure high-speed operation of essential functions of the on-vehicle information system. Alternatively, the basic function module 30 may be stored in the external storage medium 13 such as a DVD-ROM or a CD-ROM and is written for use into an electrically rewritable flash memory at start-up or at a predetermined point of time after start-up.

An extended function module 40 is written in native codes adapted for the microprocessor 2 and the navigation OS 22 and is stored in the ROM 1. Since the extended function module 40 provides functions not included in the basic function module 30, it is loaded into the RAM 3 as required and is started therefrom. Alternatively, only the basic function module 30 may be stored in the ROM 1. The extended function module 40 may be stored in the external storage medium 13 so as to be loaded into the RAM 3 as required.

An extended function interface module 31 is included in the basic function module 30. The extended function interface module 31 comprises libraries that define interfaces that allow the basic function module 30 to use the extended function module 40.

A basic function interface module 41 is included in the extended function module 40 and is loaded into the RAM 3 at the same time as the extended function module 40. The basic function interface module 41 comprises libraries that define interfaces that allow the extended function module 40 to access the basic function module 30.

A description will now be given of the operation according to the first embodiment.

The basic function module 30 provides basic on-vehicle information services such as navigation service and normal audio CD playback. A description will be given below of how a type of service is switched to another type of service according to the type of medium.

Figure 3:
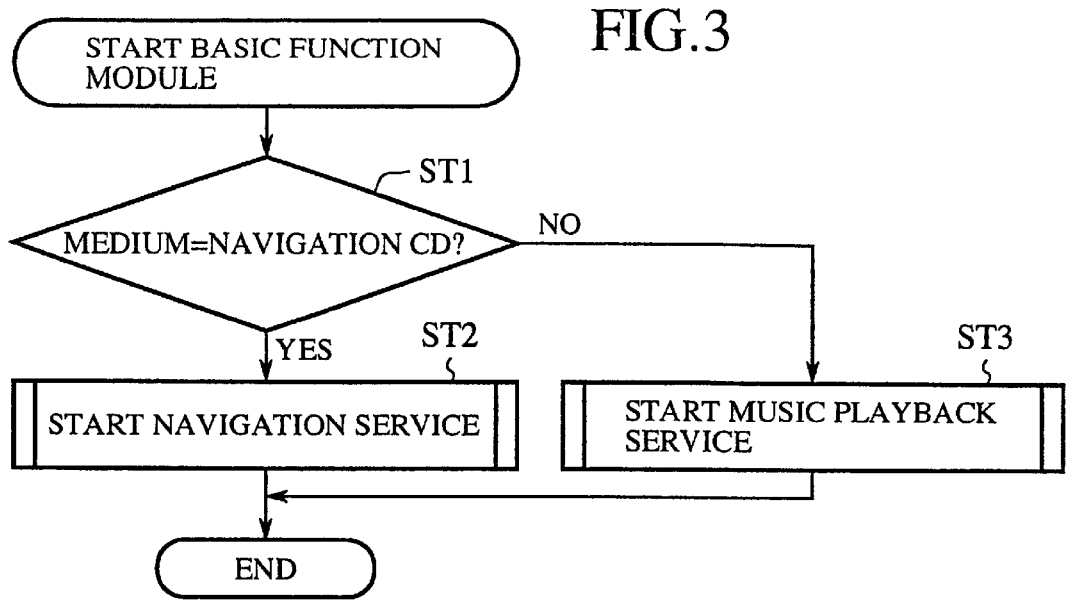
FIG. 3 is a flowchart showing an operation related to selection of supplied information service according to the first embodiment.

Referring to FIG. 3, when the basic function is started upon power-on, a determination is made in step ST1 as to the type of the external storage medium 13 inserted in the external storage drive 4. When it is determined that the inserted external storage medium 13 is a navigation CD, the navigation service is started in step ST2. When, for example, a music CD is inserted, the music playback service is started in step ST3. When the service is started, exchange of the external storage medium 13 is detected by the external storage drive 4 so that the determination in step ST1 is repeated.

The basic operation for carrying out the navigation service after step ST2 will now be described with reference to FIG. 4.

Figure 4:
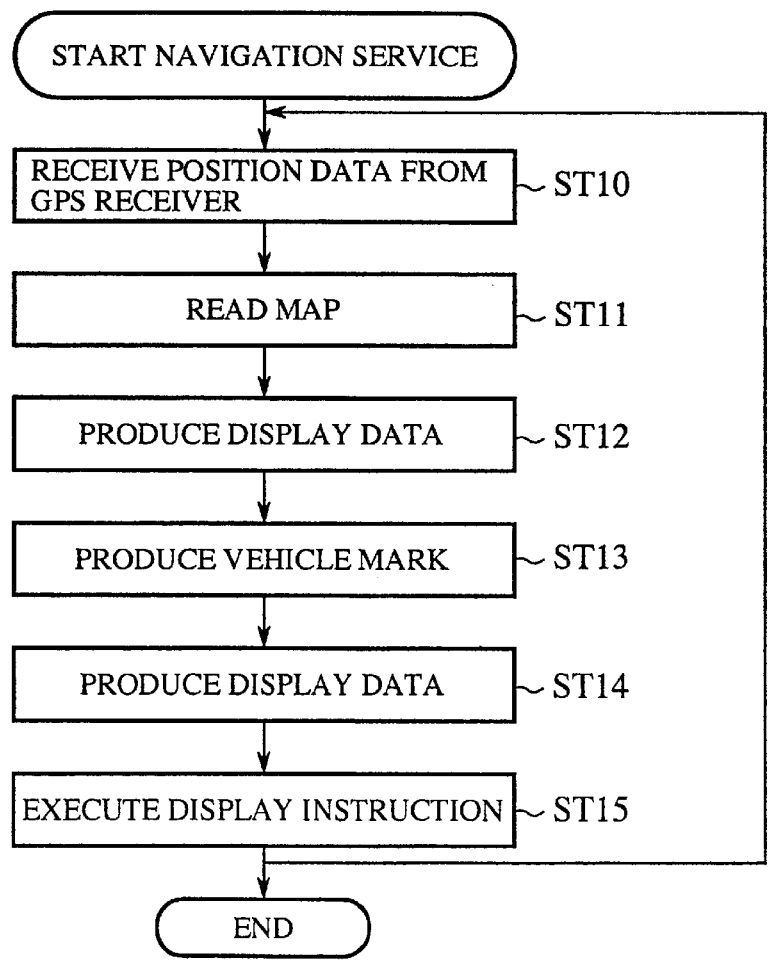
FIG. 4 is a flowchart showing an example of operation related to navigation service according to the first embodiment of the present invention.

Referring to FIG. 4, when the navigation service is started, a positioning signal from a GPS receiver (not shown) connected to the peripheral 11 is received in step ST10 by the microprocessor 2 via the peripheral interface 12. The positioning signal received by the microprocessor 2 is converted into information (latitude and longitude) of the vehicle location. In step ST11, the external storage drive 4 is driven via the external storage IF 5 so as to read data of a map showing the position of the vehicle from the external storage medium 13. The data thus read is stored in a predetermined area in the RAM 3. In step ST21, the map data thus read is converted according to a predetermined algorithm into a format required by the graphic controller 6 so that the map is displayed. In step ST13, the graphic data indicating the vehicle position is similarly created. The display data is produced in step ST14 and transferred to the frame buffer 7. In step ST15, a display instruction is executed so that the graphic controller 6 converts the display data stored in the frame buffer 7 into video data at predetermined intervals so that the video data is received by the display 8 for display of the image. According to the above-described construction, the map display navigation service that continues to display a map around the vehicle on the display 8 is provided to a driver.

Figure 5:
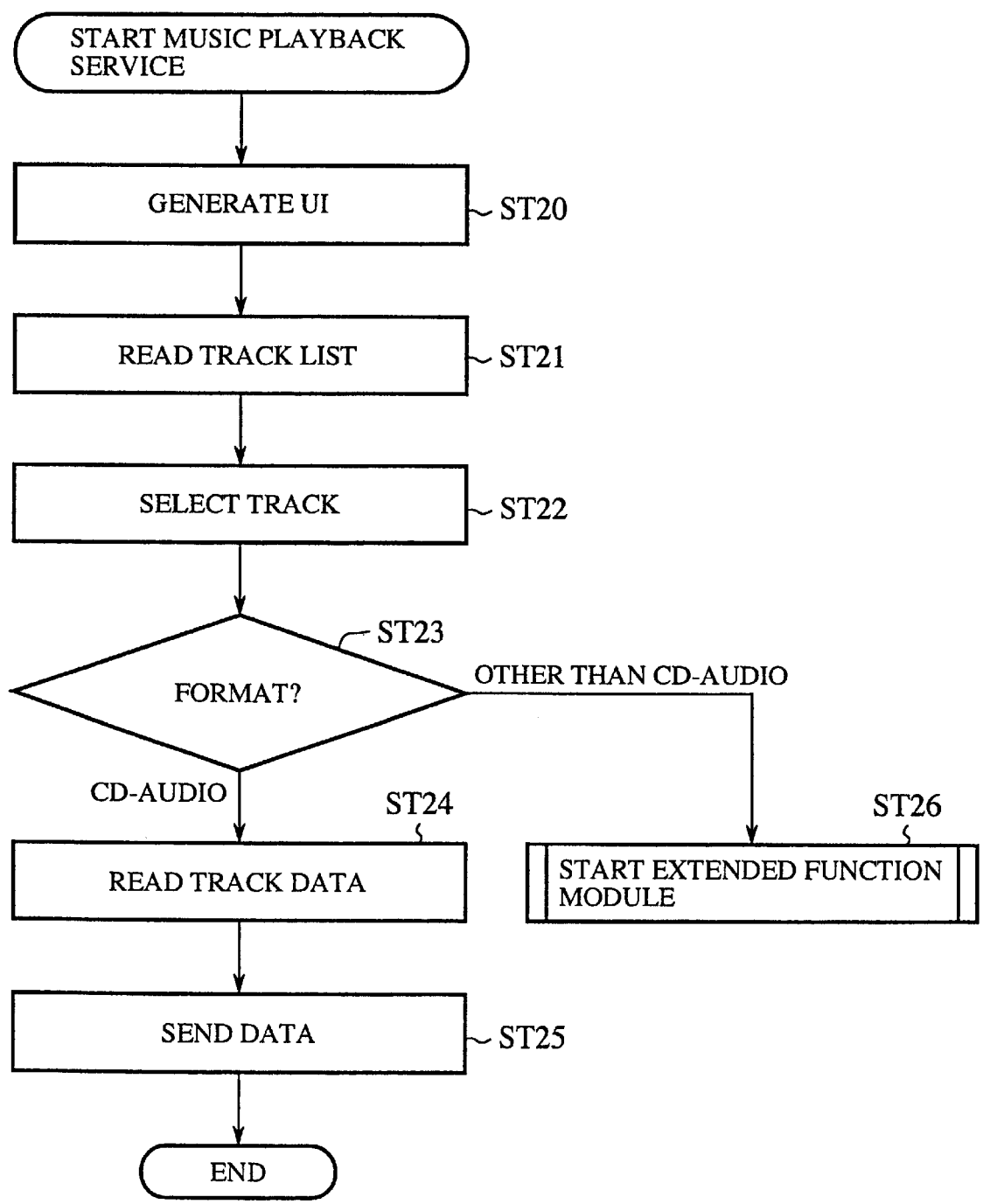
FIG. 5 is a flowchart showing an example of operation related to music playback service according to the first embodiment.

Referring to FIG. 5, a description will now be given of the operation executed when the music playback service is started in step ST13 of FIG. 3.

When the music playback service is started, the user is presented with a display of the number of tracks and playable time. A user interface (UI) that allows the user to select a desired track is generated and displayed in step ST20. The entire list of recorded music tracks is read in step ST21 and displayed in the UI. In step ST22, when the user designates a track to be played back using the input device (not shown), a determination is made as to the format of the designated track. When it is determined in step ST23 that the music is recorded in a music CD format (CD-Audio), the track data is read in step ST24. In step ST25, the data is presented to a DA converter (not shown) of the peripheral interface 12. The presented data is played back via an audio amplifier and a speaker (not shown) provided in the peripheral 11.

Described above is the operation performed by the basic operation module. Hereinafter, the function of playing back the extended format of music data will be described below, as an example of the operation performed by the extended function module. When it is determined in step ST23 of FIG. 5 that the music is recorded in a format other than the CD-Audio format, i.e., in a format that compresses music, for example, it is necessary to cause the microprocessor 2 to expand the data by computation. Nowadays data compression formats with increasingly higher performance continue to be developed so that it is necessary to update the expansion program and to start the extended function module capable of such an update is to be started in step ST26.

Figure 6:
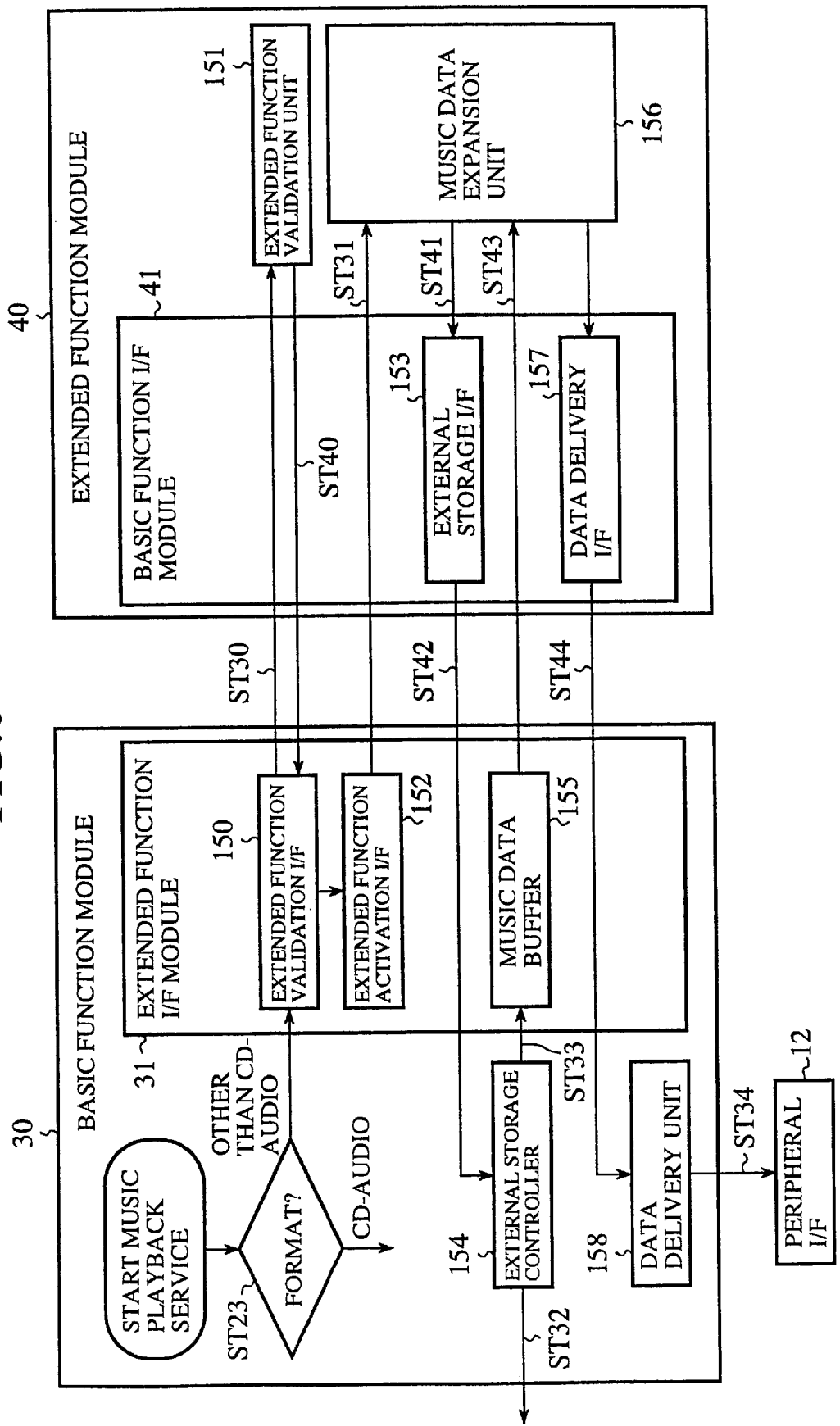
FIG. 6 illustrates cooperation between an extended function module and a basic function module according to the first embodiment.

Referring to FIG. 6, a description will now be given of cooperation between the basic function module and the extended function module. When it is determined by the music playback service in the basic function module 30 (ST23) that the music is recorded in a format other than the CD-Audio format, the extended function module is started in step ST26 in FIG. 5. Referring to FIG. 6, a format type is set in step ST30 in an extended function validation interface provided in the extended function interface module 31 so as to call an interface function. The extended function validation interface places an inquiry with an extension function validation unit in the extended function module 40 to determine whether the format can be processed, using a method of inter-process/inter-module communication such as command/event messaging. In step ST40, the extended function validation unit responds by indicating whether the format can be processed in the extended function module 40. When a response indicating that the format can be processed is returned in step ST40, messaging is performed between the extended function interface module 31 and the extended function module 40 via an extended function activation interface so as to start a music expansion program. When a response indicating that the format cannot be processed is received in step ST40, an associated message indicating that the format cannot be processed is displayed in the UI.

When the expansion program is started in step ST31, a request for music data is given in step ST41. More specifically, a request for acquiring music data is issued to the external storage interface provided in the basic function interface module 41 in the extended function module 40. In step ST42, the external storage interface uses messaging to inform an external storage controller in the basic function module 30 of function addresses and information such as parameters to be set during the control. In step ST32, the external storage controller acquires music data from the external storage drive (not shown), based on the received information. The acquired music data is set in a music data buffer defined in the extended function interface module 41. In step ST43, a music data expansion unit 156 in the extended function module 40 expands the music data thus set. The data thus expanded for playback is transmitted in step ST44 to a data delivery unit in the basic function module 30 via a data delivery interface defined in the basic function module 41. In step ST34, the music is played back like ordinary CD-Audio via an amplifier and a speaker (not shown) via the peripheral interface 12 for music playback.

Thus, according to the first embodiment, an interface module for interoperation of the basic function and the extended function is provided in each of the basic function module and the extended function module. Only those interfaces necessary for cooperation required by the modules are provided so that the overall module size is reduced and the reliability of the entire system is improved. Other advantages include improved quality of response, facilitation of initial design, and reduction in cost. It is also possible to develop and install extended function applications independent of the basic functions. When the existing portions is updated, the number of steps for building the entire system is reduced. Accordingly, advantages are provided in terms of development cost and length of time required for development.

Second Embodiment

Figure 7:
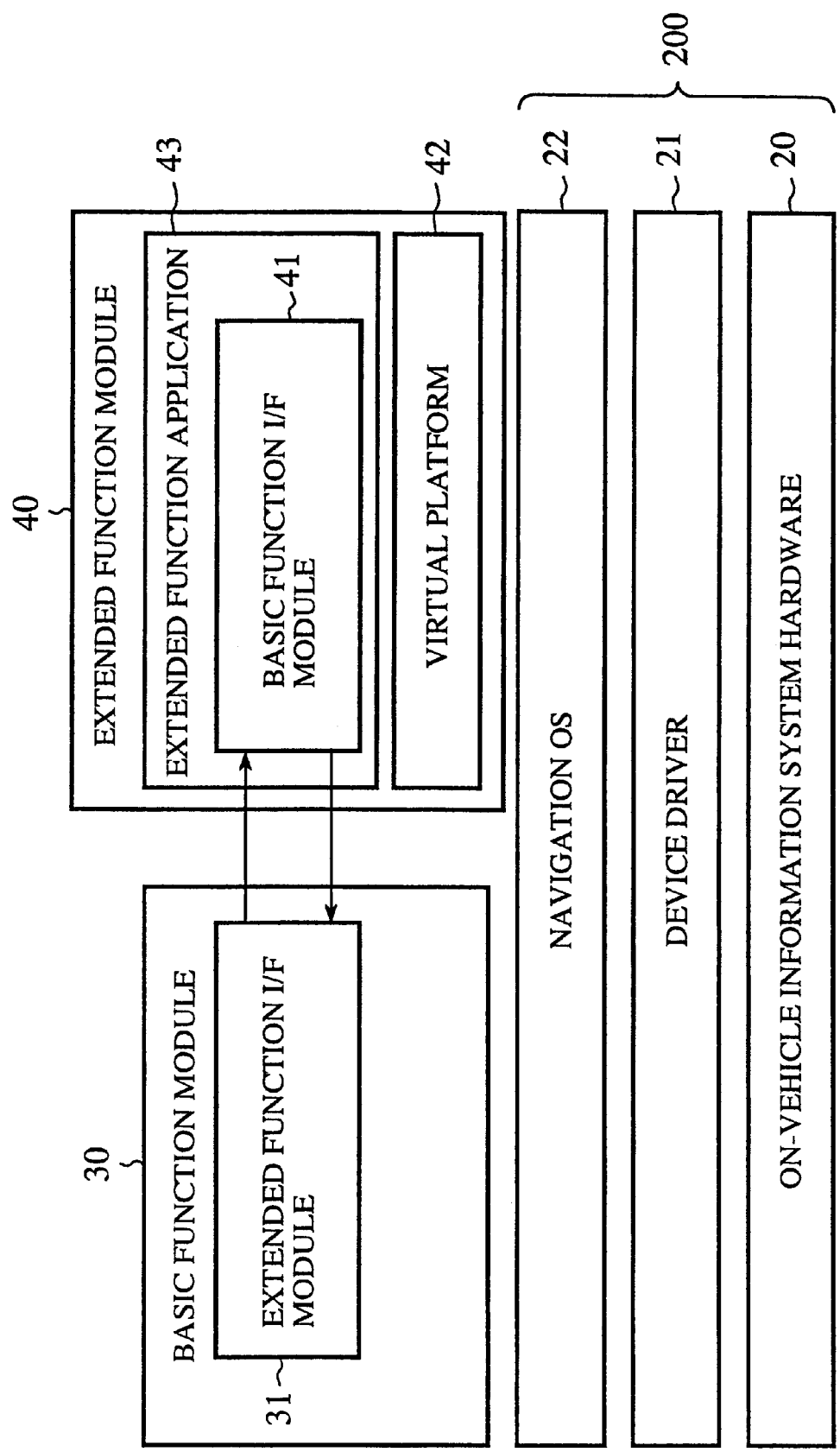
FIG. 7 shows a multi-layered construction of an on-vehicle information system according to a second embodiment of the present invention.

FIG. 7 shows a multi-layer construction of an on-vehicle information system according to a second embodiment of the present invention. In FIG. 7, the elements 20–31 and 200 are the same as the corresponding elements of the first embodiment, so that the description thereof is omitted. The extended function module 40 for extension of functions largely comprises a virtual platform 42 and an extended function application responsible for actual processing. The extended function application 43 has the basic function interface module 41 defined therein.

The extended function module 40 of the first embodiment is written in application codes dependent on the navigation OS 22. In the second embodiment, the extended function module 40 comprises the virtual platform 42 operated on the navigation OS 22, and the extended function application 43 is written in application codes adapted for the virtual platform 42 but independent of the type of the navigation OS 22.

The virtual platform 42 may be integral with the extended function module 40 and recorded in the external storage medium 13 and read into the RAM 3 as required. Alternatively, the virtual platform 42, either integral with the extended function module 40 or separate therefrom, may be stored in the ROM 1 and read into the RAM 3 as required.

Figure 8:
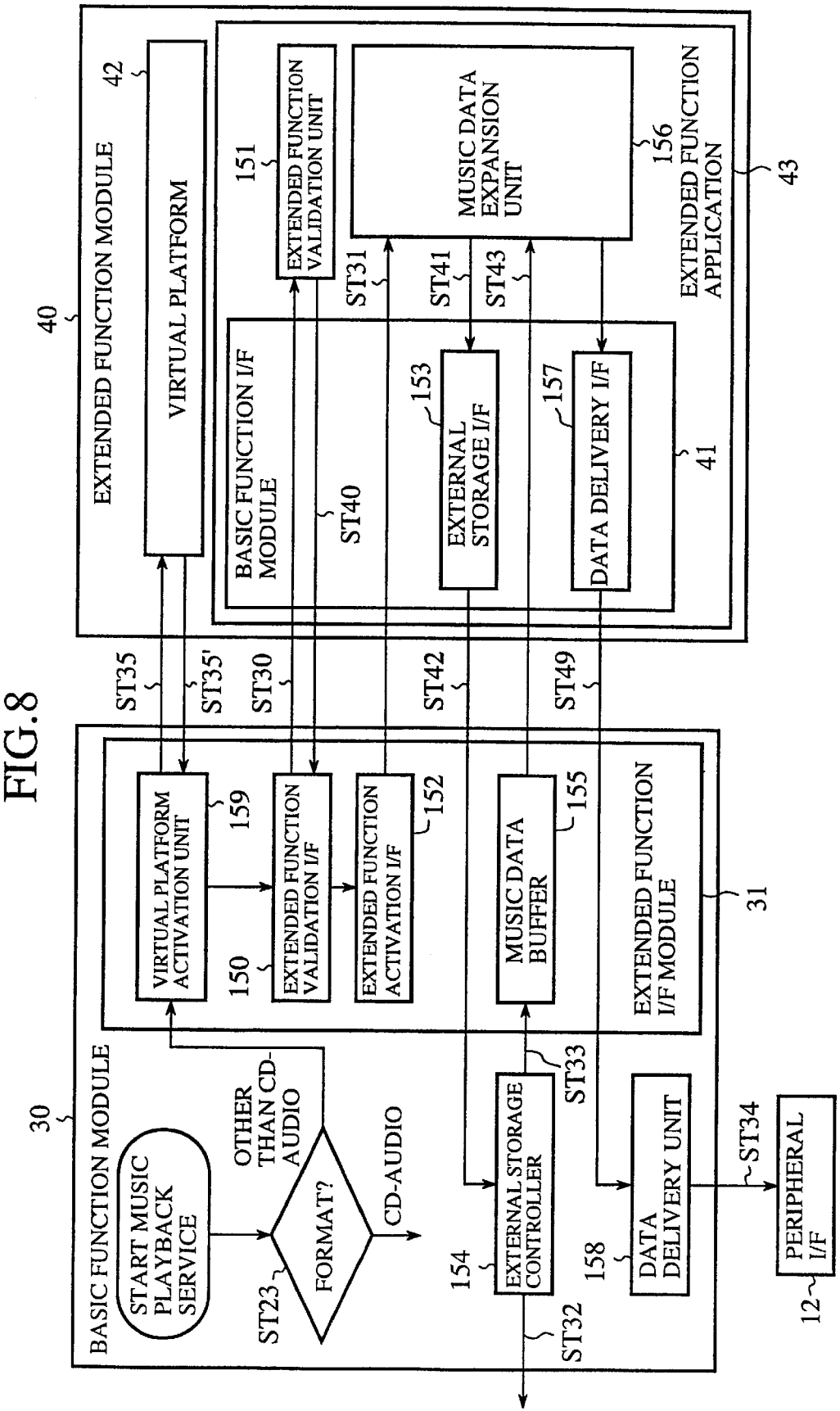
FIG. 8 illustrates cooperation between an extended function module and a basic function module according to the second embodiment.

Referring to FIG. 8, details of cooperation between the basic function and the extended function according to the second embodiment will be described by taking an example of music playback service.

In a similar configuration as the first embodiment, when a request for play back a music with a format other than CD-Audio is produced in the music playback service in the basic function module, control is turned to step ST35, where a virtual platform activation unit provided in the extended function interface module 31 executes a virtual platform activation instruction so that the virtual platform 42 of the extended function module 40 is activated. When the virtual platform 42 is activated, it provides in step ST35' the virtual platform activation unit with a return value indicating that the activation is complete. When it is acknowledged that the activation is complete, an inquiry is placed in step ST30 via the extended function validation interface provided in the extended function interface module 31 to determine whether the service can be processed. The subsequent steps are the same as the corresponding steps of the first embodiment so that the description thereof is omitted.

With the construction described above, the extended function application 43 can be written in a manner independent of the type of the navigation OS 22. Since the same application module can be used irrespective of a change in the system or the navigation OS, the cost and time required for system development are reduced, and reuse of resources becomes possible.

Third Embodiment

Figure 9:
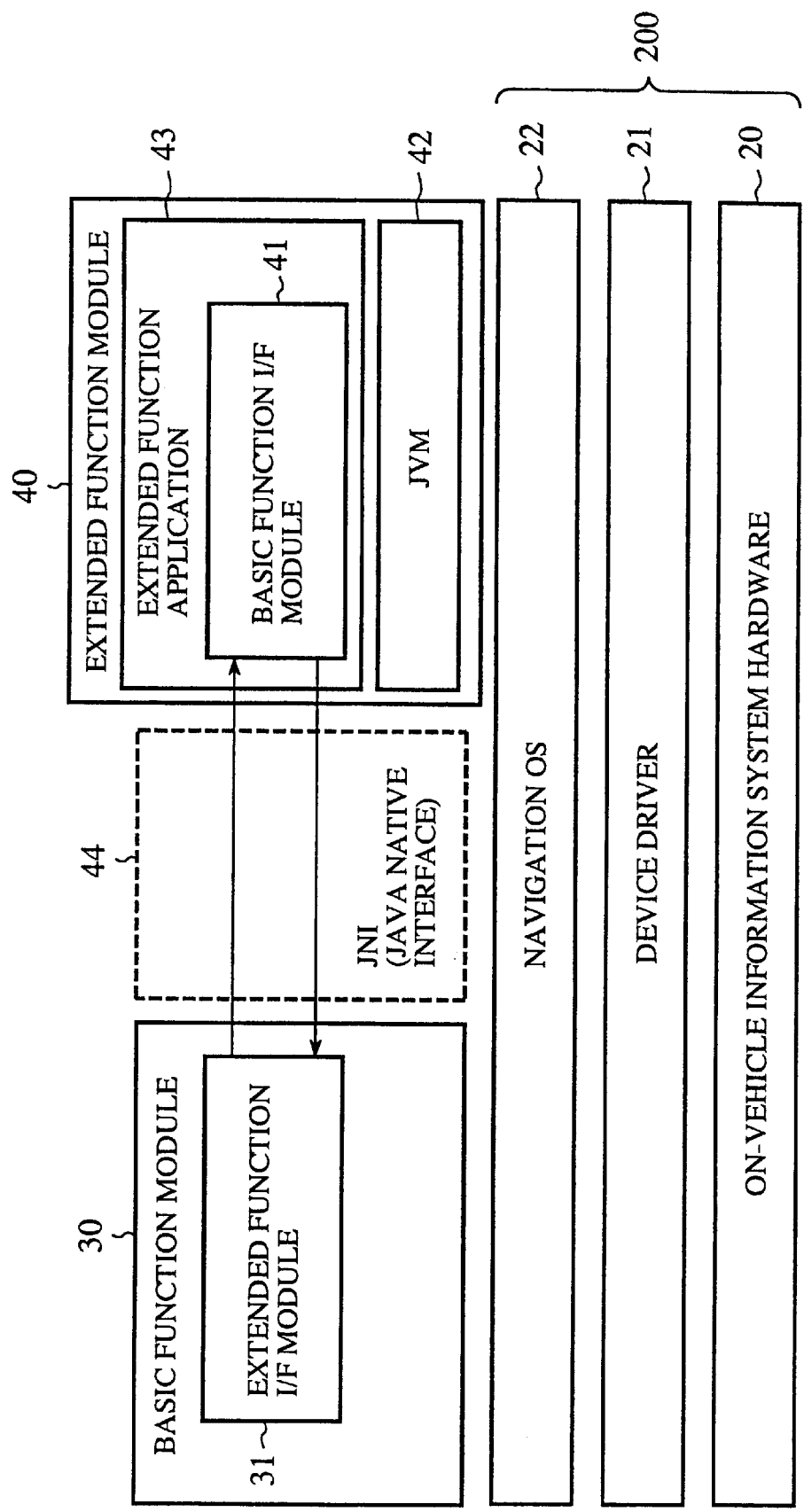
FIG. 9 shows a multi-layered construction of an on-vehicle information system according to a third embodiment of the present invention.

FIG. 9 shows a multi-layer construction of an on-vehicle information system according to a third embodiment of the present invention. In the third embodiment, the virtual platform 42 for the second embodiment is replaced by a Java Virtual Machine (JVM). The extended function application 43, the extended function interface module 41 are written in Java application codes operated on the JVM. Messaging or data communication between the basic function module 30 written in codes dependent on the navigation OS 22, and the basic function interface module 41 of the extended function application 43 is performed using Java Native Interface 44.

Referring to FIG. 9, elements 30–31 and 200 are the same as the corresponding elements of the first and second embodiments, so that the description thereof is omitted. The extended function module 40 comprises the JVM 42 and the extended function application 43 responsible for actual processing and written in Java. The extended function application is provided with the basic function interface module 41. The extended function interface module 31 defined in the basic. function module 30 exchange data and commands with the basic interface module 41 defined in the extended function application 43 in accordance with the communication specification of the JNI 44.

Figure 10:
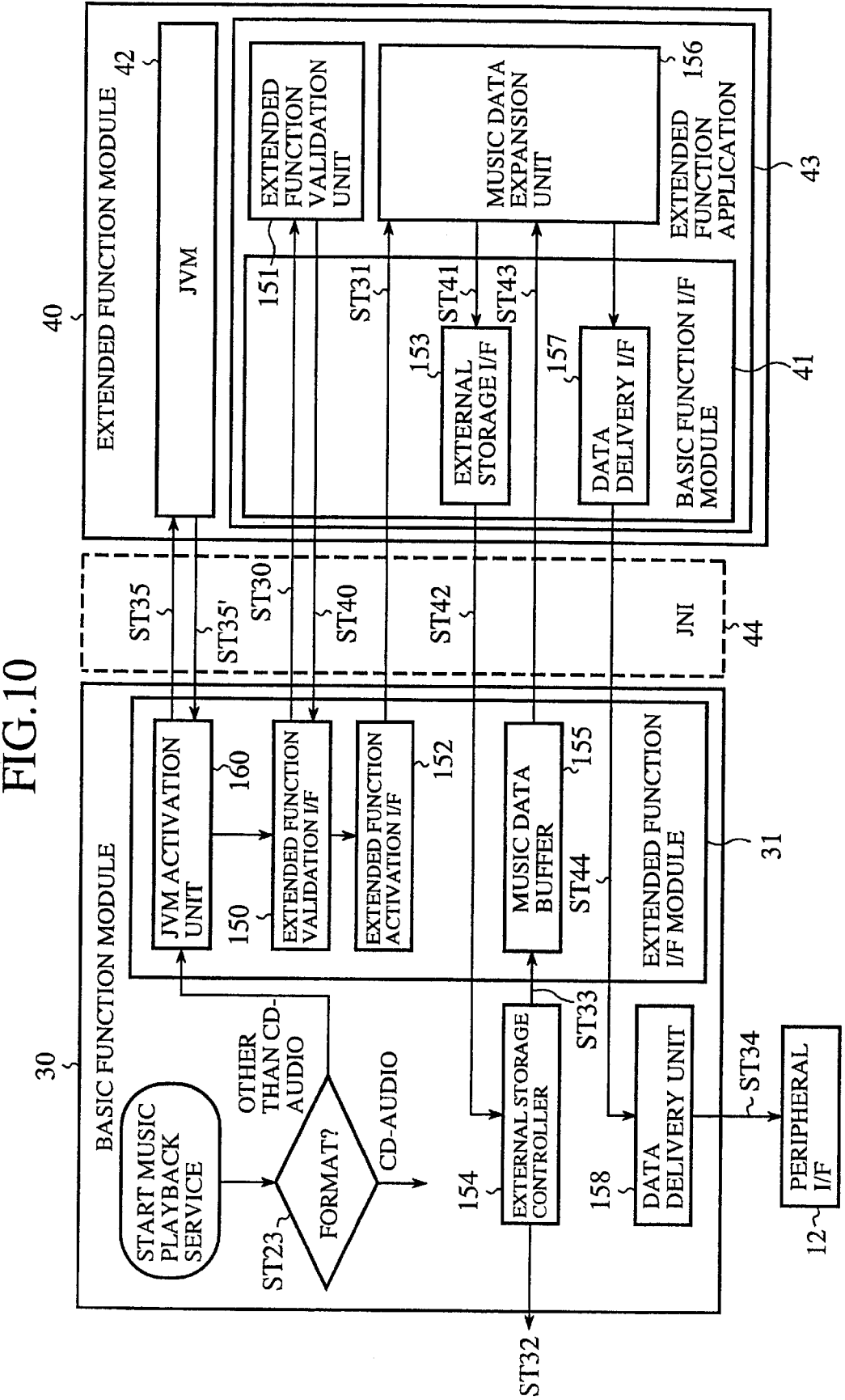
FIG. 10 illustrates cooperation between an extended function module and a basic function module according to the third embodiment.

Details of cooperation between the basic function and the extended function according to the third embodiment will be described with reference to FIG. 10, by taking an example of the music playback service.

In a similar configuration to the first and second embodiments, when a request for playback of music of a format other than CD-Audio is generated in the music playback service of the basic function module, an activation instruction is executed in step ST35 in an JVM activation unit provided in the extended function interface module 31. By calling a constructor function in the extended function module 40, the JVM 42 is started. When the JVM 42 is started, a pointer to a work area of the JVM 42 is acquired in the form of a return value of the constructor function in step ST35'. By identifying a variable pointed to by the pointer, the extended function module 40 and the basic function module 30 are set up for exchange of data and commands.

After the JVM is started, a command is issued as a Java application to inquire whether the extended function module 40 is provided with an applicable expansion program. A response to the inquiry is given in step ST40 in the extended function module 40. When it is determined that there is an applicable program, an expansion program is started in step ST31 as an extended function application, using the work area acquired in step ST35. A pointer is acquired in the form of a return value from the expansion program, the pointer indicating a work area shared by the expansion program and the basic function module, thus setting up the system for data exchange. When the expansion program is started, the external storage interface in the basic function interface module 41 is called in step ST41 in order to acquire the music data to be processed. In the external storage interface, there are defined proxy access patterns simulating common variable addresses and command patterns to be presented to the external storage controller in the basic function module 30. When an access occurs to the proxy access pattern in step ST42, the JNI 44 converts the pxoxy access pattern into a function pattern and a variable pattern valid in the basic function module 30 so that the external storage controller is activated. In step ST32, the external storage controller (not shown) acquires the music data to be played back from the external storage medium. The music data thus acquired is transferred in step ST33 to the music data buffer so as to be available for use by the extended function application 43. More specifically, in step ST33, the music data buffer stores the data in a common area, using a pointer of the common variable acquired as a response in step ST31. The music buffer sends a command to the music data expansion unit 156 in the extended function application 43, indicating that the storage is complete. In step ST43, the expansion process is performed. The music data converted into a format capable of being played back in an ordinary peripheral 11 is output in step ST44 via the data deliver interface 157 in the basic function interface module 41, using a pointer to a data delivery buffer in the basic function module 30 and a function pointer of the data delivery unit 158 in the basic function module 30. In step ST34, the music data is delivered via the peripheral interface 12 to the peripheral 11 for playback.

With the above-described construction, it is possible to utilize the extended function written in the general-purpose Java, irrespective of the type of platform and navigation OS. Development of an extended function is also facilitated in a manner unaffected by a change in the platform and the navigation OS.

Fourth Embodiment

Figure 11:
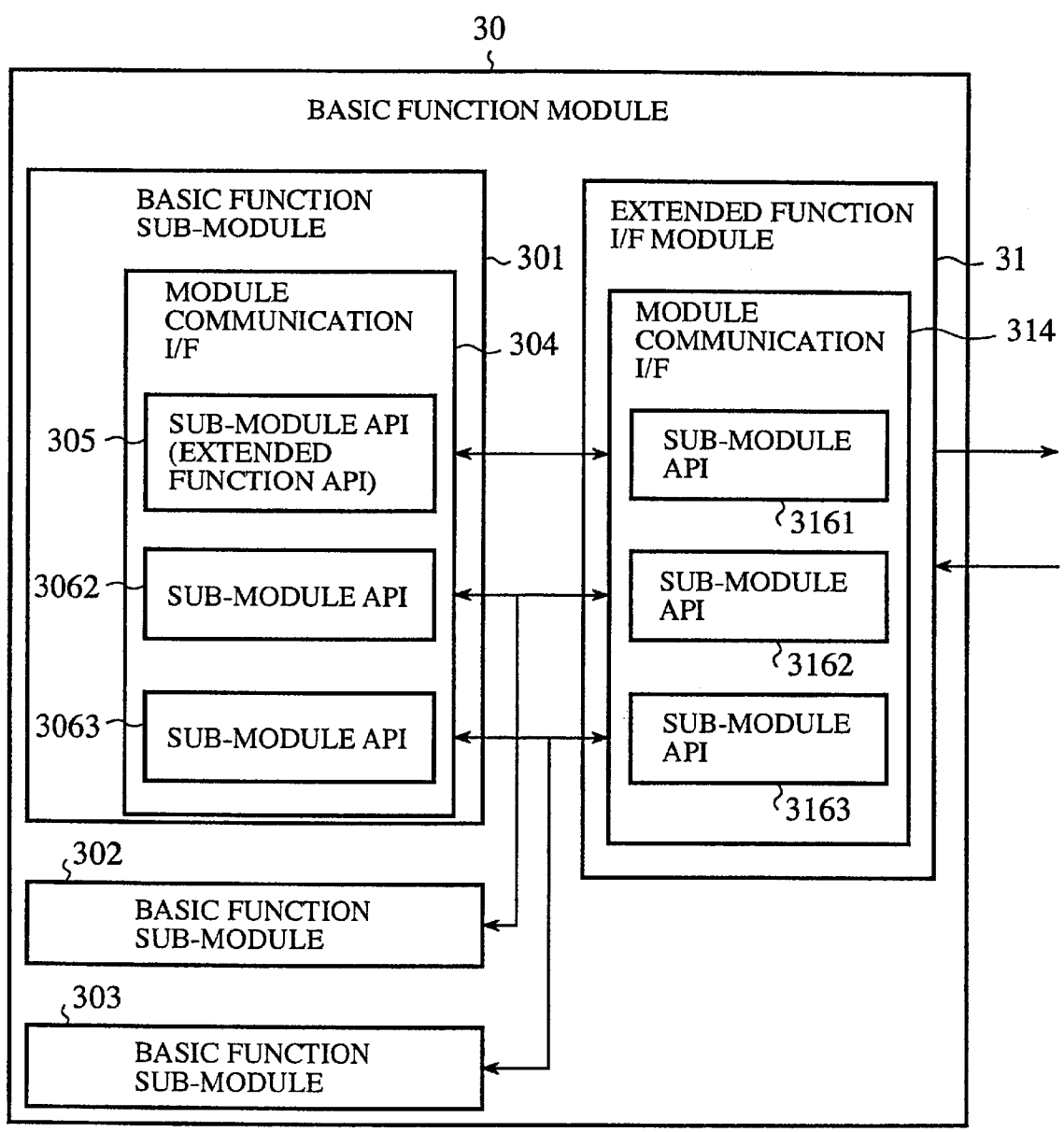
FIG. 11 is a block diagram showing a construction of a basic function module according to a fourth embodiment of the present invention.

FIG. 11 shows a construction of an on-vehicle information system according to a fourth embodiment, illustrating an example of the basic function module different from that of the first through third embodiments.

Referring to FIG. 11, the basic function module 30 comprises programs providing the basic functions in the on-vehicle information system. Reference numerals 301-303 indicate sub-modules defined as segmentations of the respective basic functions provided by basic function module. For example, the basic function sub-module 301 is responsible for music playback, the basic function sub-module 302 is responsible for navigation service, and the basic function sub-module 303 is responsible for browsing service that accesses network information provided by the Internet or a dedicated information center. A module communication interface 304 is included in each of the basic function sub-modules and responsible for communication with the other modules. Sub-module application programming interfaces (API) 305, 3062 and 3063 are provided in the module communication interface 304 and define communication specifications for communication with the other modules. The sub-module API 305 defines the communication specification with respect to the extended function interface 31, the sub-module API 3062 defines the communication specification with respect to the basic function sub-module 302, and the sub-module API 3063 defines the communication specification with respect to the basic function sub-module 303. The sub-module APIs 3062 and 3063 are required when the basic function sub-module 301 has a relation to the basic function sub-modules 301 and 302. When there is no relation, the sub-module APIs 3062 and 3063 are not necessary. The other basic function sub-modules 302 and 303 are also provided with respective module communication interfaces for communication with other modules, and these module communication interfaces are provided with an extended function API and sub-module APIs as required. The extended function interface module 31 is provided in the basic function module 30 for interfacing with the extended function. In a similar configuration as the basic function sub-module 301, the extended function interface module 31 is provided with a module communication interface 314. The module communication interface 314 is provided with sub-module APIs 3161, 3162, and 3163.

Figure 12:
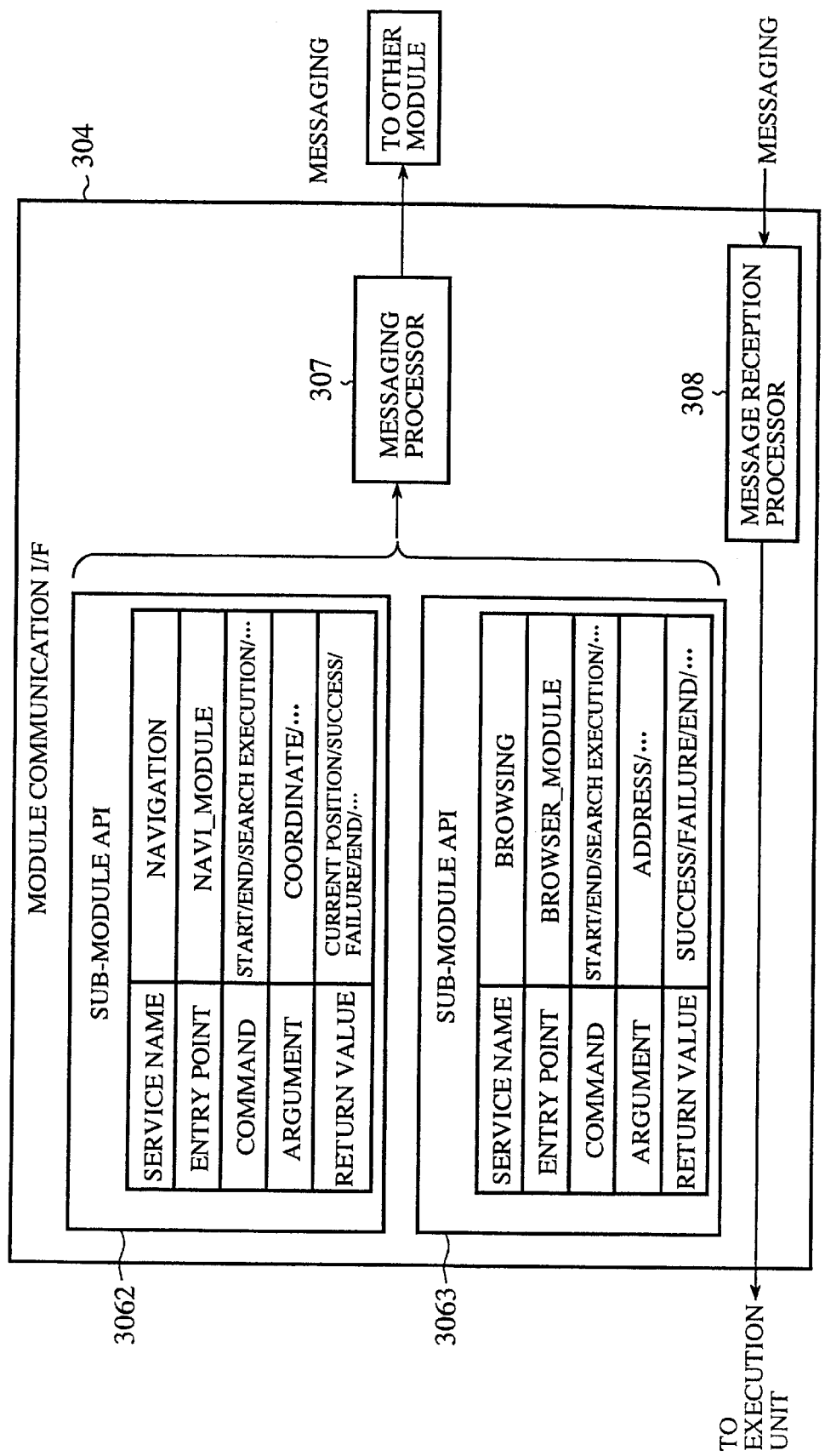
FIG. 12 illustrates a specification of communication between modules according to the fourth embodiment.

FIG. 12 shows details of the module communication interface 304 and the sub-module APIs 3062 and 3063.

Referring to FIG. 12, examples of the sub-module APIs 3062 and 3063 defined in the module communication interface 304 are shown. The sub-module API 3062 is adapted for a navigation service basic function sub-module, and the sub-module API 3063 is adapted for a browsing service basic function sub-module. In the sub-module APIs 3062 and 3063, functions provided by the corresponding module and a data exchange format for utilizing the functions are defined as application programming interfaces. In the example of FIG. 12, for the browsing service basic function module, there are defined formats for exchange of data and commands, including the name of service, the name of function for exchange of data and commands, a command area, an argument area and a return value area. More specifically, for the browsing service, the function name of Browser_Module is used. Commands for starting and ending the browsing, and a command for search execution are defined. It is also specified that an address subject to the search should be written as an argument of the function. A status value indicating whether the search is successful or in failure is given as a return value from the function.

When the function is called from the basic function sub-module in accordance with the API definition, a messaging processor 307 defined in the module interface unit transmits information to the other sub-module in accordance with a predetermined procedure using messaging.

A message reception processor 308 in the module communication interface of the basic function sub-module 304 receiving the message transfers the function, data and commands defined in the to an execution unit 309 in the basic function sub-module 304, in accordance with a predetermined procedure.

Figure 13:
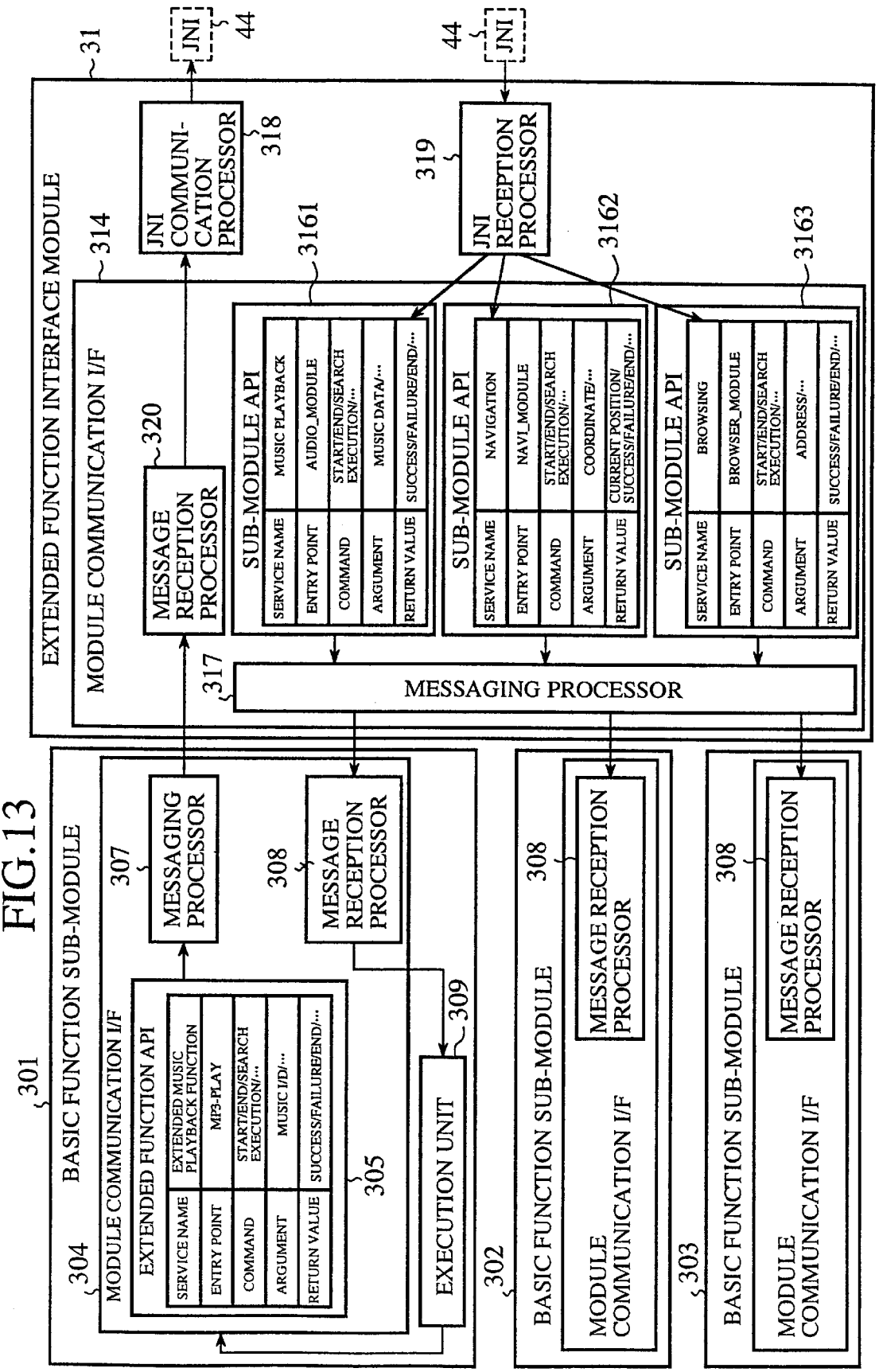
FIG. 13 illustrates cooperation between an extended function interface module and a basic function interface module according to the fourth embodiment.

FIG. 13 shows details of cooperation with respect to the extended function interface module 31.

Referring to FIG. 13, the extended function API 305 is provided to use the extended function service provided by the extended function module 40 via the extended function interface module 31. In a similar configuration as the sub-module APIs 3062 and 3063, the name of extended function service, the name of function for exchange of data and commands, and formats for exchange of data and commands including a command area, an argument area and a return value area. When the function of the extended function module 40 is necessary in the internal process of the basic function sub-module 301, the internal process calls the extended function using the extended function API.

The call from the extended function API 305 is transmitted to the module communication interface 314 in the extended function interface module 31 and then received by a message reception processor 320 in the module communication interface 314. The call for the extended function received by the message reception processor 320 is converted into a format that can be used in the extended function module 40 via a JNI communication processor 318 and the JNI 44.

When the extended function module 40 accesses the function of the basic function sub-module 30, a call transmitted via the JNI 44 is received by a JNI reception processor 319. Depending on the type of function called by the extended function module 40, the JNI reception processor 319 uses the corresponding one of the sub-module APIs 3161, 3162 and 3163 so as to call the necessary basic function sub-module via the message communication processor 317.

The message transmitted by using any of the sub-module APIs 3161, 3162 and 3163 is delivered to the execution unit 309 via the message reception processor 308 defined in the module communication interface 304 of the corresponding basic function sub-module. In the execution unit 309, the necessary sub-module processing is called.

In the above-described construction, the module communication interface 304 of the basic function sub-module is described as being provided with the sub-module API responsible for communication with the extended function interface module 31, and the sub-module APIs 3062 and 3063 responsible for communication with the other basic function sub-modules. The module communication interface 314 of the extended function interface module 31 is described as being provided with the sub-module APIs 3161, 3162 and 3163 responsible for communication with the respective basic function sub-modules 301, 302 and 303. Alternatively, the module communication interfaces 304 and 314 may only be provided with the sub-module API adapted for the module with which inter-module communication is necessary.

According to the configuration of the fourth embodiment, it is possible to divide the basic function module into individual sub-modules adapted for respective functions. Functions can be invoked by switching between the sub-modules.

The sub-module API can also be defined as segmentations adapted for individual sub-modules. It is thus possible to switch between APIs depending on the switching between the sub-modules. Software scale and man-hour required at the time of function updating, the cost required in correction of defects at installment, and the cost required in installment, are successfully reduced.

The processing system in the extended function module are concealed by the extended function API. It is thus possible for the basic function module to utilize the function provided by the extended function module without being affected by the processing system of the extended function module.

Fifth Embodiment

Figure 14:
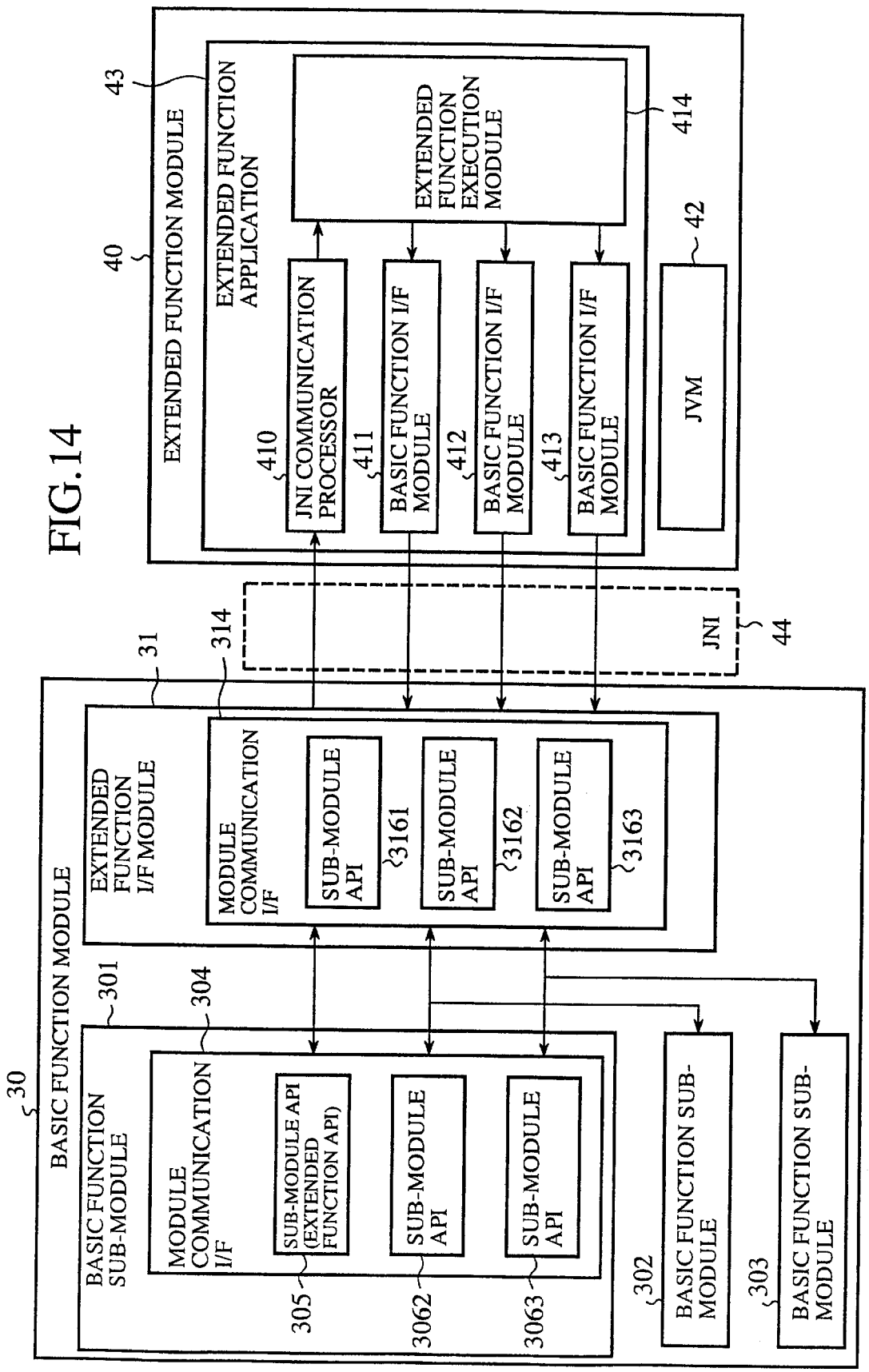
FIG. 14 illustrates cooperation between an extended function module and a basic function module according to a fifth embodiment of the present invention.
Figure 15:
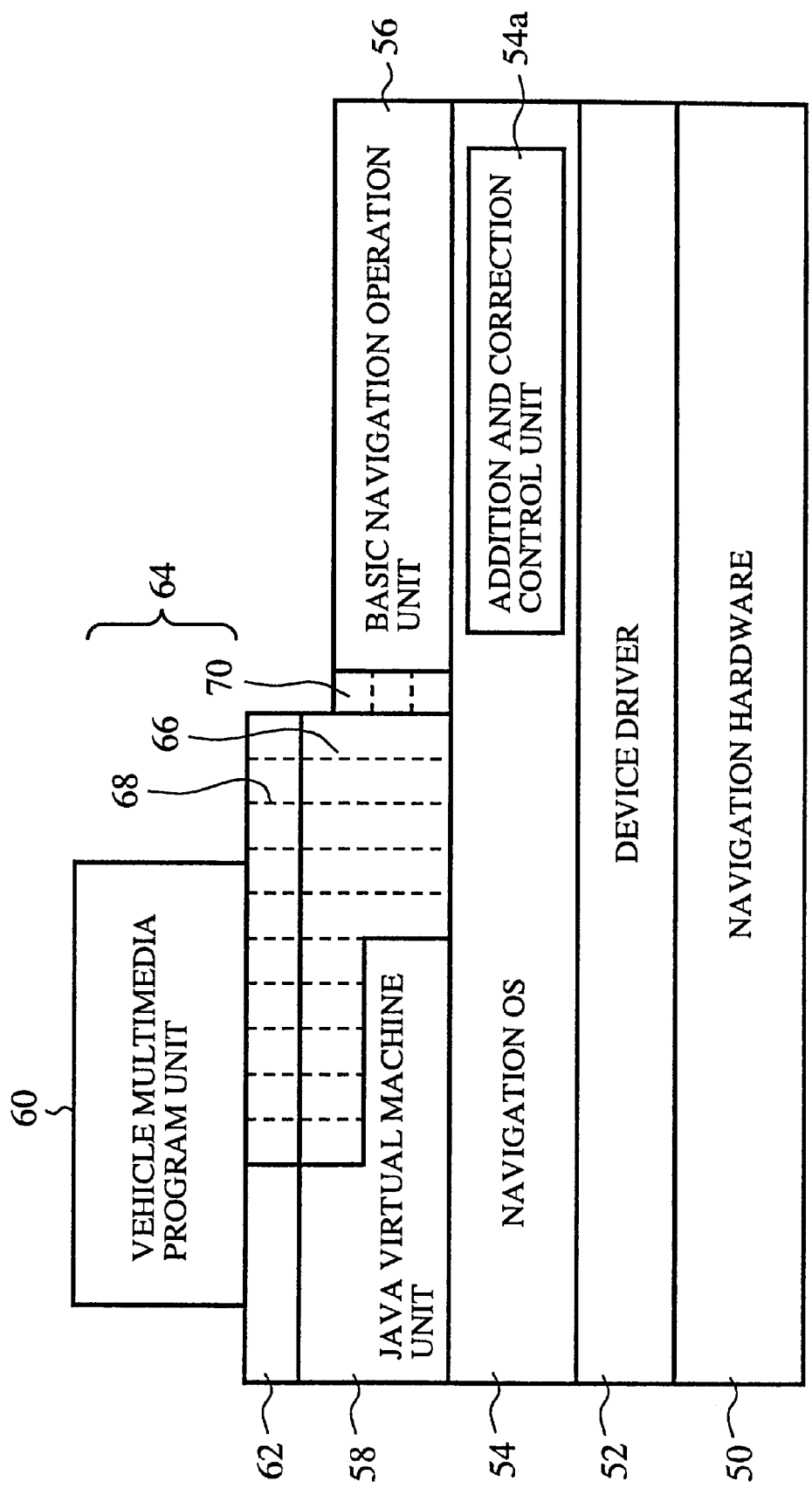
FIG. 15 shows a multi-layer construction of the related-art navigation apparatus.

FIG. 14 shows a construction of an on-vehicle information system according to a fifth embodiment of the present invention, illustrating an alternative construction of the extended function module.

Referring to FIG. 14, the construction of the basic function module is the same as that of the fourth embodiment, so that the description thereof is omitted. The extended function module 40 largely comprises the JVM 42 and the extended function application 43. The extended function application 43 comprises an extended function execution module 414 responsible for execution of an actual extended function, a JNI communication processor 410 responsible for processing communication from the basic function module 30 via the JNI 44, basic function interface modules 411, 412 and 413 for utilizing the basic function sub-modules 301, 302 and 303 in the basic function module 30, respectively.

In the fifth embodiment, the function of the extended function execution module 414 that allows the basic function sub-modules to utilize the function of the extended function execution module 414, and the data format, are defined in the sub-module API 305. The function is delivered to the JNI communication processor 410 in the extended function application 414 via the extended function interface module 31 and the JNI 44. The JNI communication processor 410 calls the received function, and converts the data into a format that can be processed by the extended function execution module 414.

When the extended function execution module 414 uses the function of any of the basic function sub-modules in the basic function module 30, the basic function interface modules 411, 412 and 413 provided in the extended function application 43 are used. The basic function interface modules 411, 412 and 413 are provided to correspond to the respective basic function sub-modules requested by the extended function execution module 414. The basic function interface modules 411, 412 and 413 are defined as proxy patterns written in Java to define the same API function as defined in the sub-module APIs 3161, 3162 and 3163 of the extended interface module 31. The proxy pattern is defined in the form of functions and variables accessible by the extended function application 43. The proxy pattern is interpreted by the JNI reception processor 319 via the JNI 44 and delivered to the basic function sub-module by using the sub-module API of the extended function interface 41.

In the fifth embodiment, the plurality of basic function interface modules 411, 412 and 413 are provided in the extended function application 43 of the extended function module 40 to correspond to the plurality of basic function sub-modules 301, 302 and 303. Alternatively, only those basic function interface modules corresponding-to necessary basic function sub-modules with which communication is necessary may be provided.

According to the configuration of the fifth embodiment, it is possible for the extended function execution module 414 to use a normally available function to access the basic function sub-module without being affected by the processing system of the basic function module 30.

The present invention is not limited to the above-described embodiments, and variations and modifications may be made without departing from the scope of the present invention.

What is claimed is:

1. An on-vehicle information system comprising:
    a platform unit including hardware and basic software controlling and managing the hardware and executing a program;
    a basic function module started simultaneously with said platform unit and including programs that offer basic on-vehicle information services; and
    an extended function module built into said platform unit, and including programs that offer extended on-vehicle information services, wherein
        said basic function module includes an extended function interface module for exchanging information and commands with said extended function module,
        said extended function module includes a basic function interface module for exchanging information and commands with said basic function module, and
        said extended function module and said basic function module exchange information for cooperation via at least one of said basic function interface module and said extended function interface module.

2. The on-vehicle information system according to claim 1, wherein said extended function module comprises:
    a virtual platform built on said platform unit; and
    an extended function application interpreted and executed in said virtual platform, and written in a language not dependent on said platform unit, and wherein said basic function interface module is included in said extended function application.

3. The on-vehicle information system according to claim 2, wherein said virtual platform is a Java virtual machine, said extended function application is written in Java, and said basic function interface module and said extended function interface module communicate with each other in accordance with Java native interface.

4. The on-vehicle information system according to claim 1, wherein the basic function module comprises a plurality of basic function sub-modules and a second extended function interface module, and one of (i) of said basic function sub-modules and (ii) said second extended function interface module includes a communication specification definition unit defining a specification for communication.

5. The on-vehicle information system according to claim 4, wherein said basic function interface module includes an extended function application module with basic function interface modules for basic function sub-modules for communication in executing an extended function, said basic function sub-module being used via said basic function interface module.

* * * * *